US012482377B2

(12) United States Patent
Brunschwig

(10) Patent No.: US 12,482,377 B2
(45) Date of Patent: Nov. 25, 2025

(54) POLYHEDRAL OPTICAL CONDUIT

(71) Applicant: Fernand Brunschwig, New York, NY (US)

(72) Inventor: Fernand Brunschwig, New York, NY (US)

( * ) Notice: Subject to any disclaimer, the term of this patent is extended or adjusted under 35 U.S.C. 154(b) by 235 days.

(21) Appl. No.: 18/310,776

(22) Filed: May 2, 2023

(65) Prior Publication Data

US 2024/0144843 A1 May 2, 2024

Related U.S. Application Data

(63) Continuation-in-part of application No. 29/843,646, filed on Jun. 22, 2022.

(60) Provisional application No. 63/338,841, filed on May 5, 2022.

(51) Int. Cl.
  *G09B 23/22* (2006.01)
  *G02B 5/30* (2006.01)
(52) U.S. Cl.
  CPC ........... *G09B 23/22* (2013.01); *G02B 5/3025* (2013.01); *G02B 5/3083* (2013.01)
(58) Field of Classification Search
  CPC ..... G09B 23/22; G02B 5/3025; G02B 5/3083
  USPC ........................................................ 434/303
  See application file for complete search history.

(56) References Cited

U.S. PATENT DOCUMENTS

| 4,729,650 A | * | 3/1988 | Jennings | .................. | G02C 9/00 351/41 |
|---|---|---|---|---|---|
| 5,577,140 A | | 11/1996 | Endo | | |
| 6,816,309 B2 | | 11/2004 | Chen | | |
| 7,110,623 B1 | | 9/2006 | Kalibjian | | |
| 7,245,343 B2 | | 7/2007 | Suzuji | | |
| 8,317,331 B2 | | 11/2012 | Li | | |

(Continued)

FOREIGN PATENT DOCUMENTS

| CN | 302680833 | 12/2013 |
|---|---|---|
| CN | 303395717 | 9/2015 |

(Continued)

OTHER PUBLICATIONS

Jean-Francois Gauvin, Playing with Quantum Toys: Julian Schwinger's Measurement Algebra and the Material Culture of Quantum Mechanics Pedagogy at Harvard in the 1960s, Phys. Perspect. 20 (2018) 8-42.

(Continued)

*Primary Examiner* — Peter S Vasat
*Assistant Examiner* — Stephen Alvesteffer
(74) *Attorney, Agent, or Firm* — Brian M. Gaff, Esq.

(57) ABSTRACT

A polyhedral optical conduit having a longitudinal axis, a first transverse axis perpendicular to the longitudinal axis, and a second transverse axis perpendicular to both the longitudinal axis and the first transverse axis. The polyhedral optical conduit includes a plurality of parallel sides. Two of the parallel sides define openings (e.g., apertures) that further define a passageway there between. The passageway includes an optical device disposed within it, typically oriented in the plane defined by the transverse axes. Electromagnetic radiation, e.g., light, is projected into the passageway. When the light exits the passageway it may appear differently depending on the orientation of the polyhedral optical conduit and the optical device therein. This provides a visual representation of quantum phenomena.

20 Claims, 8 Drawing Sheets

(56) References Cited

U.S. PATENT DOCUMENTS

| | | | |
|---|---|---|---|
| D708,242 S * | 7/2014 | Huschka | D16/101 |
| 8,817,370 B2 | 8/2014 | Kimoto | |
| 10,302,959 B2 | 5/2019 | Baba | |
| 2006/0119936 A1 | 6/2006 | Ockenfuss | |
| 2007/0146676 A1 | 6/2007 | Tanitsu | |
| 2014/0327870 A1 * | 11/2014 | Chow | G02C 7/12 |
| | | | 351/159.56 |
| 2015/0378168 A1 | 12/2015 | Stacey | |
| 2023/0139001 A1 * | 5/2023 | Jouard | G02C 7/101 |
| | | | 351/159.56 |

FOREIGN PATENT DOCUMENTS

| | | | |
|---|---|---|---|
| CN | 110428710 A * | 11/2019 | G09B 23/22 |
| CN | 213601001 | 7/2021 | |
| JP | 2004125857 | 4/2004 | |
| KR | 101569146 | 11/2015 | |
| WO | 2015/043009 | 4/2015 | |

OTHER PUBLICATIONS

ISR and Written Opinion of the ISA-EPO re: corresponding international patent application No. PCT/US2023/020683, dated Aug. 9, 2023.

* cited by examiner

POLYHEDRAL OPTICAL CONDUIT

CROSS-REFERENCE TO RELATED APPLICATIONS

The present disclosure is related and claims priority to U.S. Provisional Pat. Appl. No. 63/338,841, filed on May 5, 2022, and U.S. patent application Ser. No. 29/843,646, filed on Jun. 22, 2022, the contents of each of which are hereby incorporated by reference in their entirety, for all purposes.

BACKGROUND

Field of Disclosure

Embodiments described herein are generally related to a polyhedral optical conduit. More specifically, embodiments of the invention are in the shape of a decahedron, a shape sometimes described as an octagonal prism. One or more of the embodiments may be employed in an educational setting to teach quantum mechanics to students. Other embodiments may be used in other settings to nurture hands-on experiences and provide familiarity with genuine quantum phenomena.

Typically one projects light into an opening on one end of the polyhedral optical conduit, which propagates through the conduit in a passageway, and exits at the far end of the conduit. Embodiments can include one or more structures in the passageway that operate on the light to change its appearance at the exit. Multiple conduits may be placed in sequence to form an array such that the light exiting from one conduit enters another conduit, and so on.

One obtains different results in the appearance of the exiting light depending on how the polyhedral optical conduits are oriented, what structures are included in the passageways, and the number of conduits used in sequence. These different results exemplify quantum phenomena.

Related Art

Polyhedral optical conduits generally shaped as cubes are well known. See, e.g., Jean-Francois Gauvin, *Playing with Quantum Toys: Julian Schwinger's Measurement Algebra and the Material Culture of Quantum Mechanics Pedagogy at Harvard in the* 1960s, 20 Phys. Perspect., 8 (2018).

Gauvin discloses conduits that are cubes. Because of this, they can rest on any one of the only four sides parallel to the longitudinal direction of the conduits. This limits conduit rotation to ninety degree increments between each resting position. This reduces the number of different operations that can be performed on light passing through the conduits. Consequently, this reduces the number of different results in the appearance of the light exiting the conduits. To overcome this limitation, Gauvin describes using as many as six cubes in various sequences, each containing one linear polarizer or a combination of a polarizer and a half-wave plate.

It is, however, desirable to reduce the number of conduits while still being able to generate all of the same phenomena that require the six Gauvin cubes.

SUMMARY

Embodiments of the invention include conduits in the shape of polyhedrons, such as decahedrons that can rest on any one of eight sides parallel to their longitudinal direction. Such decahedrons can be rotated in forty-five degree increments between each of eight resting positions. Consequently, decahedrons provide an advantage over the prior art because as few as three of them can generate all of the same phenomena that require six of Gauvin's cubic devices.

In one embodiment, a polyhedral optical conduit has a longitudinal axis, and first and second transverse axes perpendicular to each other and the longitudinal axis. The polyhedral optical conduit includes a plurality of pairs of parallel sides, each side having longitudinal and transverse edges. In other words, the first side of a pair lies in a first plane, and the second side of that pair lies in a second plane parallel to the first plane. Some sides that are adjacent to each other are joined along their respective longitudinal edges, defining an angle between the sides. Additional parallel sides having transverse edges are joined to at least one of the other parallel sides along their transverse edges, defining another angle. One pair of the parallel sides defines openings (e.g., apertures) in the plane defined by the transverse axes, further defining a longitudinal passageway between these openings. An optical device, such as a polarizer or a waveplate, is included in the longitudinal passageway and oriented in the plane defined by the transverse axes. Light projected into one end of the passageway exits the other end after the optical device operates on it, giving a visual representation of quantum mechanical phenomena depending on the orientation, e.g., rotation of the polyhedral optical conduit.

In another embodiment, two or more polyhedral optical conduits are arranged along a common longitudinal axis forming an array. Each of the polyhedral optical conduits comprising the array are similar but may include different types or combinations of optical devices, e.g., a polarizer in the first and a waveplate plus polarizer in the second. Light projected into the passageway passes through the first conduit and then through the second conduit before exiting. Various rotational orientations of each of the conduits, i.e., the various rotational orientations of the optical device(s) therein, affect the appearance of the exiting light.

In yet another embodiment, notations are placed along the exterior of the polyhedral optical conduit to label the orientation of each. The notations include Dirac bra-ket designations. These help reinforce the quantum mechanical nature of the different appearances of the exiting light.

BRIEF DESCRIPTION OF THE DRAWINGS

In the figures, elements and steps denoted by the same or similar reference numerals are associated with the same or similar elements and steps, unless indicated otherwise.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Embodiments of the invention as disclosed herein provide illustrations of quantum effects on electromagnetic radiation, e.g., light. These embodiments facilitate the teaching of quantum mechanics. For example, embodiments of the invention act on electromagnetic radiation and produce phenomena—e.g., visible changes to that radiation—that students may easily observe and correlate with quantum concepts and principles. Embodiments of the invention introduce students to the notation used in quantum science teaching and research.

Figure 1:
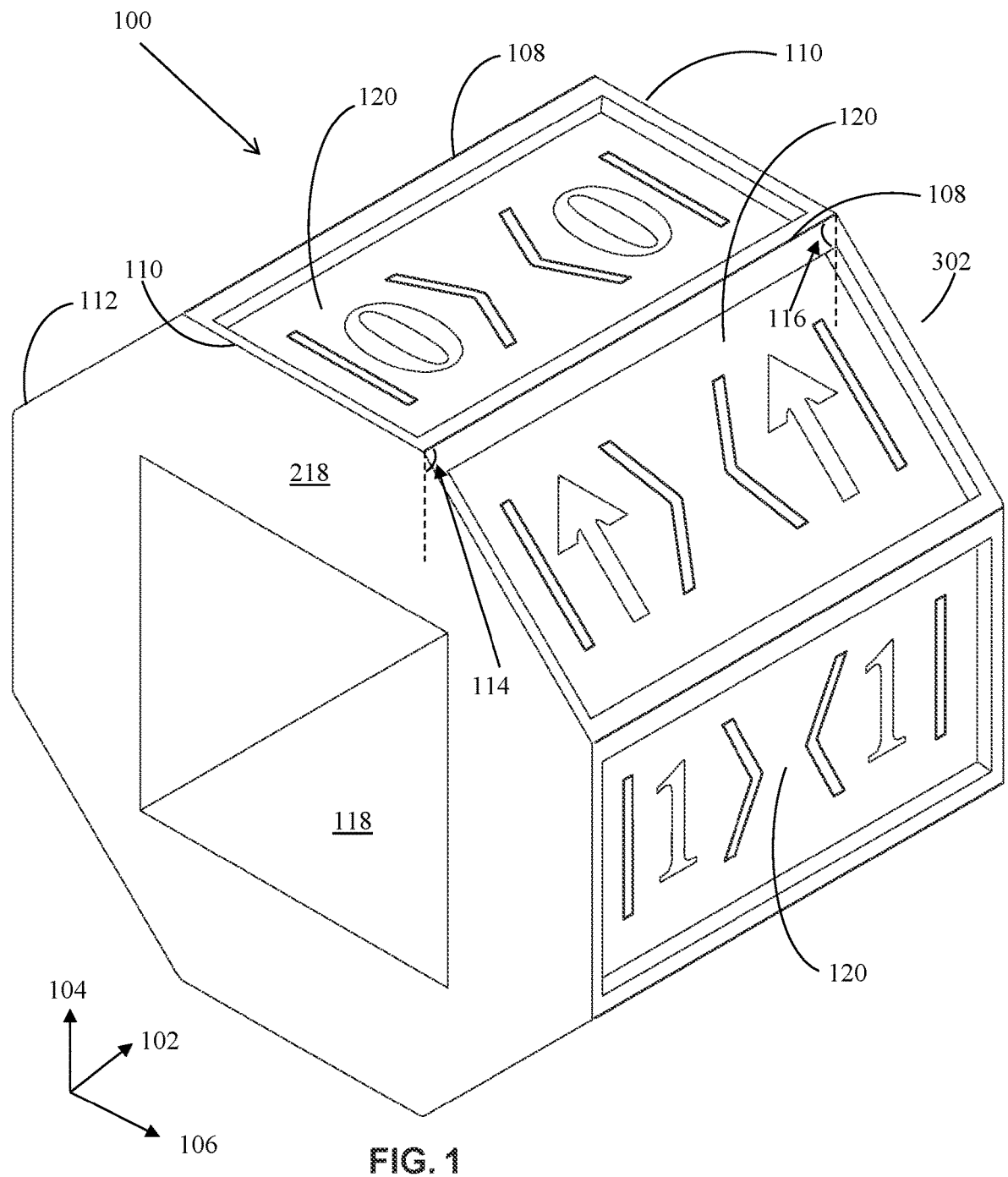
FIG. 1 illustrates an isometric view of a polyhedral optical conduit, according to some embodiments.

FIG. 1 illustrates a polyhedral optical conduit 100 according to some embodiments of the invention. To facilitate its description, the polyhedral optical conduit 100 shown is in the form of a decahedron. This shape can rotate and rest at positions on its sides in forty-five degree increments. However, embodiments of the invention are not limited to that shape.

In some embodiments, the polyhedral optical conduit 100 includes a longitudinal axis 102, a first transverse axis 104 perpendicular to the longitudinal axis 102, and a second transverse axis 106 perpendicular to both the longitudinal axis 102 and the first transverse axis 104.

Figure 2:
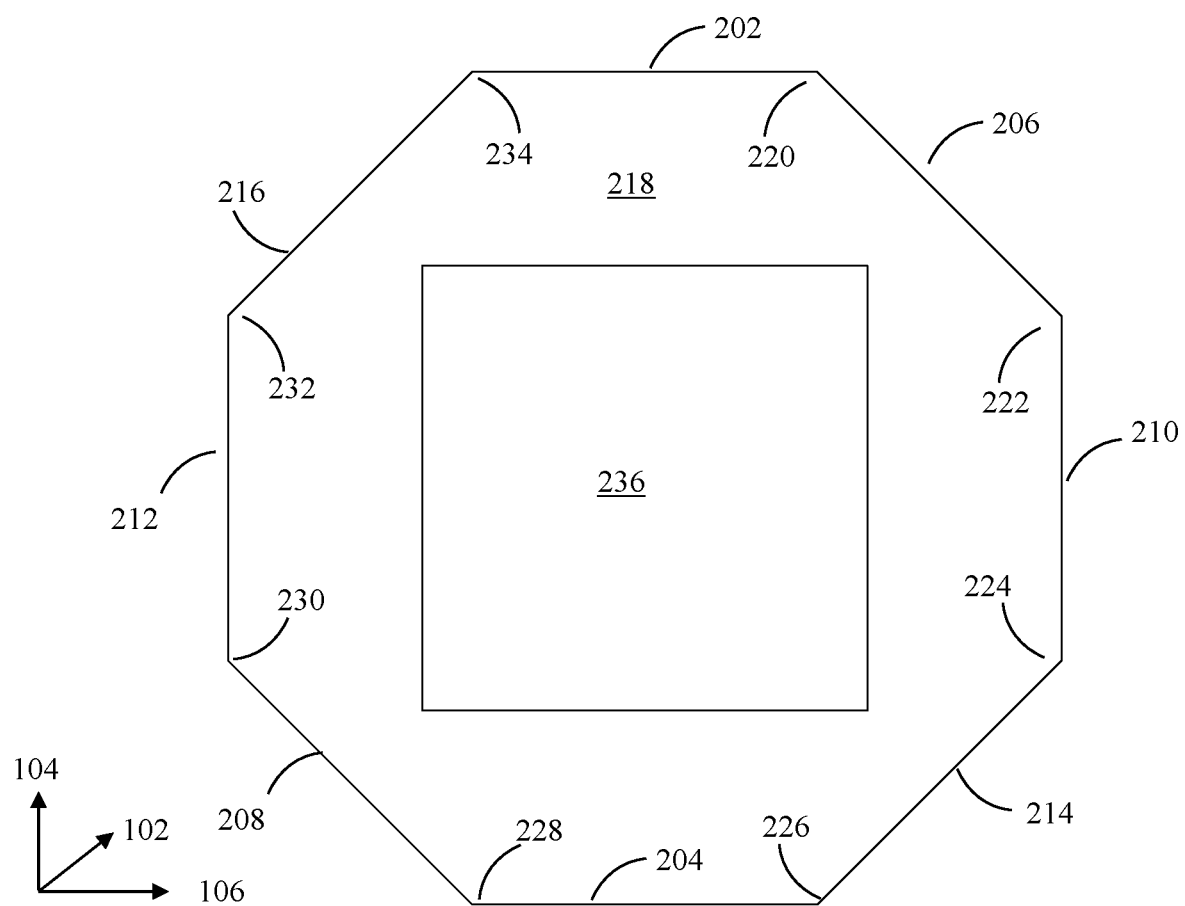
FIG. 2 illustrates a first edge view of a polyhedral optical conduit, according to some embodiments.

FIG. 2 illustrates an edge view of the polyhedral optical conduit 100 according to some embodiments of the invention. This edge view is in the plane defined by the first transverse axis 104 and the second transverse axis 106. In some embodiments, the polyhedral optical conduit 100 includes a first side 202 parallel to a second side 204, a third side 206 parallel to a fourth side 208, a fifth side 210 parallel to a sixth side 212, and a seventh side 214 parallel to an eighth side 216. Each of these sides includes two longitudinal edges 108 and two transverse edges 110.

Figure 3:
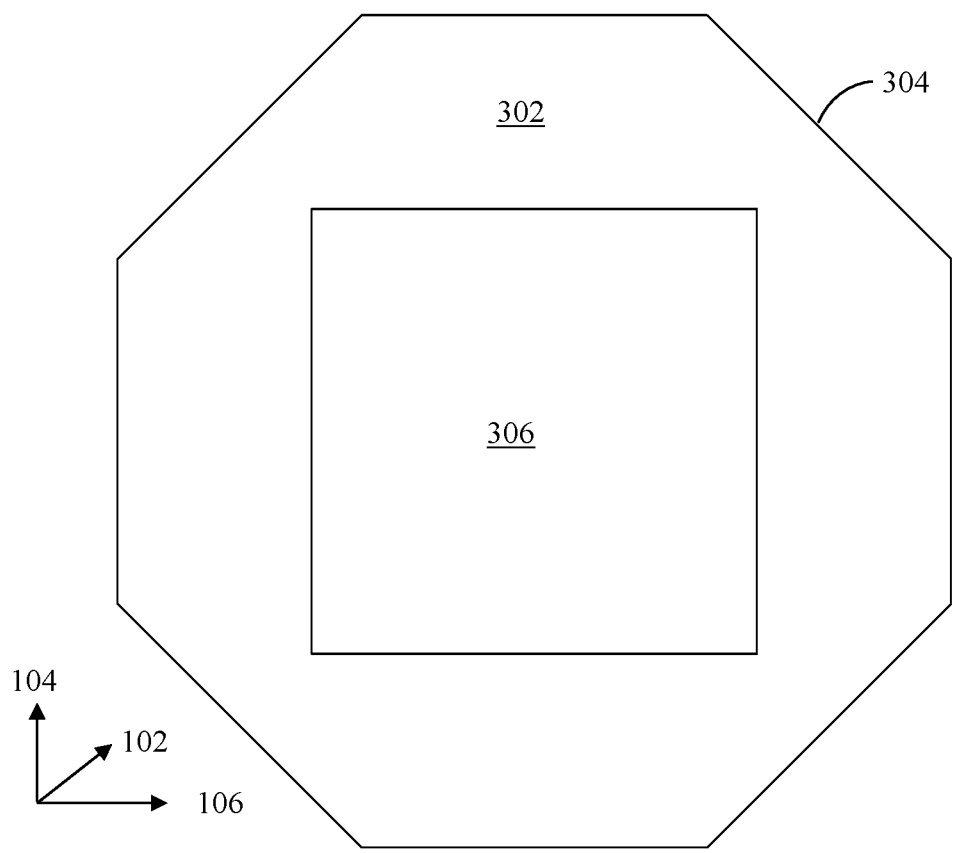
FIG. 3 illustrates a second edge view of a polyhedral optical conduit, according to some embodiments.

In some embodiments, the polyhedral optical conduit 100 includes a ninth side 218 parallel to a tenth side 302 (shown in FIG. 3). Each of these sides includes a plurality of transverse edges 112 and 304, respectively.

In some embodiments, the sides of the polyhedral optical conduit 100 are joined along one of their respective longitudinal edges at one or more defined angles. For example, in some embodiments, the first side 202 and the third side 206 are joined at a first angle 220, the third side 206 and the fifth side 210 are joined at a second angle 222, the fifth side 210 and the seventh side 214 are joined at a third angle 224, the seventh side 214 and the second side 204 are joined at a fourth angle 226, the second side 204 and the fourth side 208 are joined at a fifth angle 228, the fourth side 208 and the sixth side 212 are joined at a sixth angle 230, and the sixth side 212 and the eighth side 216 are joined at a seventh angle 232. In some embodiments, the eighth side 216 and the first side 202 are joined at an eighth angle 234.

The ninth side 218, in some embodiments, is joined to at least one of the first 202 through eighth 216 sides along one of the transverse edges 110 of each of the at least one of the first 202 through eighth 216 sides at a ninth angle 114. Similarly, in some embodiments, the tenth side 302 is joined to at least one of the first 202 through eighth 216 sides along the second of the transverse edges 110 of each of the at least one of the first 202 through eighth 216 sides at a tenth angle 116.

In some embodiments, the polyhedral optical conduit 100 includes a passageway 118 in the longitudinal direction. This passageway 118 is formed in part by the ninth side 218 and the tenth side 302. The ninth side 218 defines a first opening 236 and the tenth side 302 defines a second opening 306. These openings 236, 306 lie in separate planes defined by the first transverse axis 104 and the second transverse axis 106. Typically, these separate planes are parallel to each other. Thus, the passageway 118 lies between the first opening and the second opening and is oriented along the longitudinal axis 102. The passageway 118 may have any of a number of different cross-sectional profiles, e.g., square, rectangular, circular, elliptical, octagonal, polygonal, and the like. In some embodiments, the first opening 236 and/or the second opening 306 have shapes similar or identical to the cross-sectional profile of the passageway 118. In typical operation, a user projects light into the first opening 236 and through the passageway 118, which then exits at the second opening 306.

Figure 4:
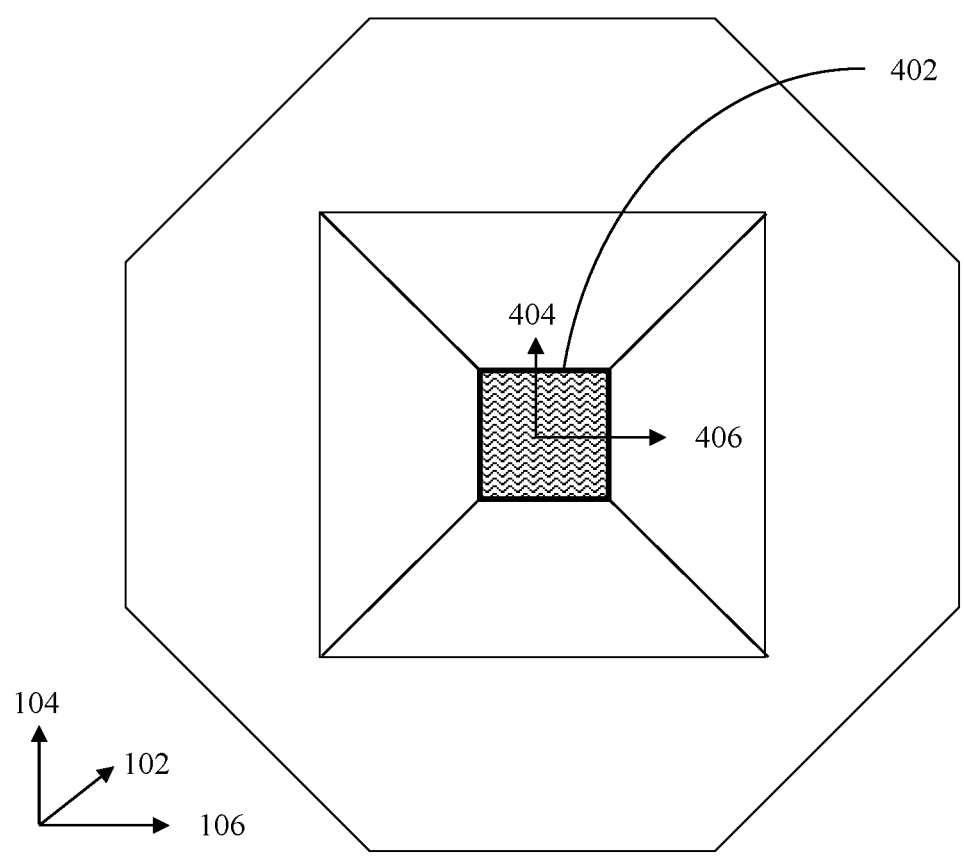
FIG. 4 illustrates an edge view of a polyhedral optical conduit containing an optical device, according to some embodiments.

FIG. 4 illustrates an embodiment wherein the polyhedral optical conduit 100 includes an optical device 402 disposed in the passageway 118. In some embodiments, the optical device 402 is positioned in a plane defined by the first transverse axis 104 and the second transverse axis 106. In some embodiments, the optical device 402 includes a polarizer, such as the American Polarizers, Inc. model AP38-006T. In other embodiments, the optical device 402 includes a waveplate, such as a half-wave waveplate or quarter-wave waveplate (e.g., American Polarizers, Inc. model APHW92-003-280NM-PC), alone or in combination with a polarizer. The optical device 402 may be characterized by having one or more axes 404, 406, e.g., optical axes. For polarizers, these optical axes are sometimes referred to as transmission and absorption axes. For waveplates, these optical axes are sometimes referred to as fast and slow axes. Polarized light with an electric field vector parallel to the transmission axis will pass through the polarizer. Polarized light with an electric field vector parallel to the absorption axis will not pass through the polarizer. Polarized light incident on a half-wave waveplate will have its polarization direction changed. Polarized light incident on a quarter-wave waveplate will change between linear polarized and circularly polarized light.

In some embodiments, the optical device 402 is oriented at an angle relative to at least one of the axes 102, 104, 106 of the polyhedral optical conduit 100. Typical angles include zero degrees and forty-five degrees. In other words, an axis 404, 406 of the optical device 402 is, in some embodiments, positioned at the specified angle relative to one of the axes 102, 104, 106. The optical device 402 may lie in the transverse plane defined by axes 104, 106, or may lie in another plane at an angle to the transverse plane. In some embodiments, the optical device 402 may be as large as the passageway 118 (i.e., have a cross sectional area the same as or similar to the cross sectional area of the passageway 118). In some embodiments, the optical device 402 may be smaller (e.g., in cross section) than the passageway 118.

As discussed below, the orientation of the optical device 402 dictates the operation of the polyhedral optical conduit 100.

In some embodiments, the orientation of the optical device 402 is fixed relative to at least one of the axes 102, 104, 106. In other embodiments, the optical device 402 is moveable relative to at least one of the axes 102, 104, 106.

This allows the user to adjust the orientation of the optical device 402, e.g., during operation of the polyhedral optical conduit 100.

In some embodiments, to facilitate the installation of the optical device 402 or other structures in the passageway 118, the passageway 118 comprises two adjacent coaxial passageways having different cross-sectional dimensions (e.g., one passageway has a larger cross-section than the other). These two coaxial passageways meet in the polyhedral optical conduit 100 and create a "lip" or "shelf" in a plane where they intersect.

In some embodiments, the optical device 402 is placed on the lip or shelf. In further embodiments, a frame is friction fit into the larger of the two coaxial passageways and holds the optical device on to the lip or shelf. In certain embodiments, the frame may be removed to change or adjust the optical device.

In some embodiments, the polyhedral optical conduit 100 includes markings 120 on one or more of the sides 202, 204, 206, 208, 210, 212, 214, 216. These markings 120 may correspond to the orientation of the optical device 402. In keeping with the quantum mechanical nature of the polyhedral optical conduit 100, the markings 120 may, in some embodiments, include Dirac bra-ket notation. See, e.g., P.A.M. Dirac, *The Principles of Quantum Mechanics* 18-22 (1930).

FIG. 1 illustrates an embodiment of the polyhedral optical conduit 100 where the markings 120 include bra and ket vectors on each side 202, 204, 206, 208, 210, 212, 214, 216. On any individual side 202, 204, 206, 208, 210, 212, 214, 216, the bra and ket vectors are identical. That is, for example:

|1> <1| on a pair of opposite sides 210, 212
|0> <0| a pair of opposite sides 202, 204
|↑> <↑| on a pair of opposite sides 206, 208
|↓><<↓| on a pair of opposite sides 214, 216

In some embodiments, identical bra and ket vectors indicate that the polarization of the light passing through the polyhedral optical conduit 100 will not change.

Figure 5:
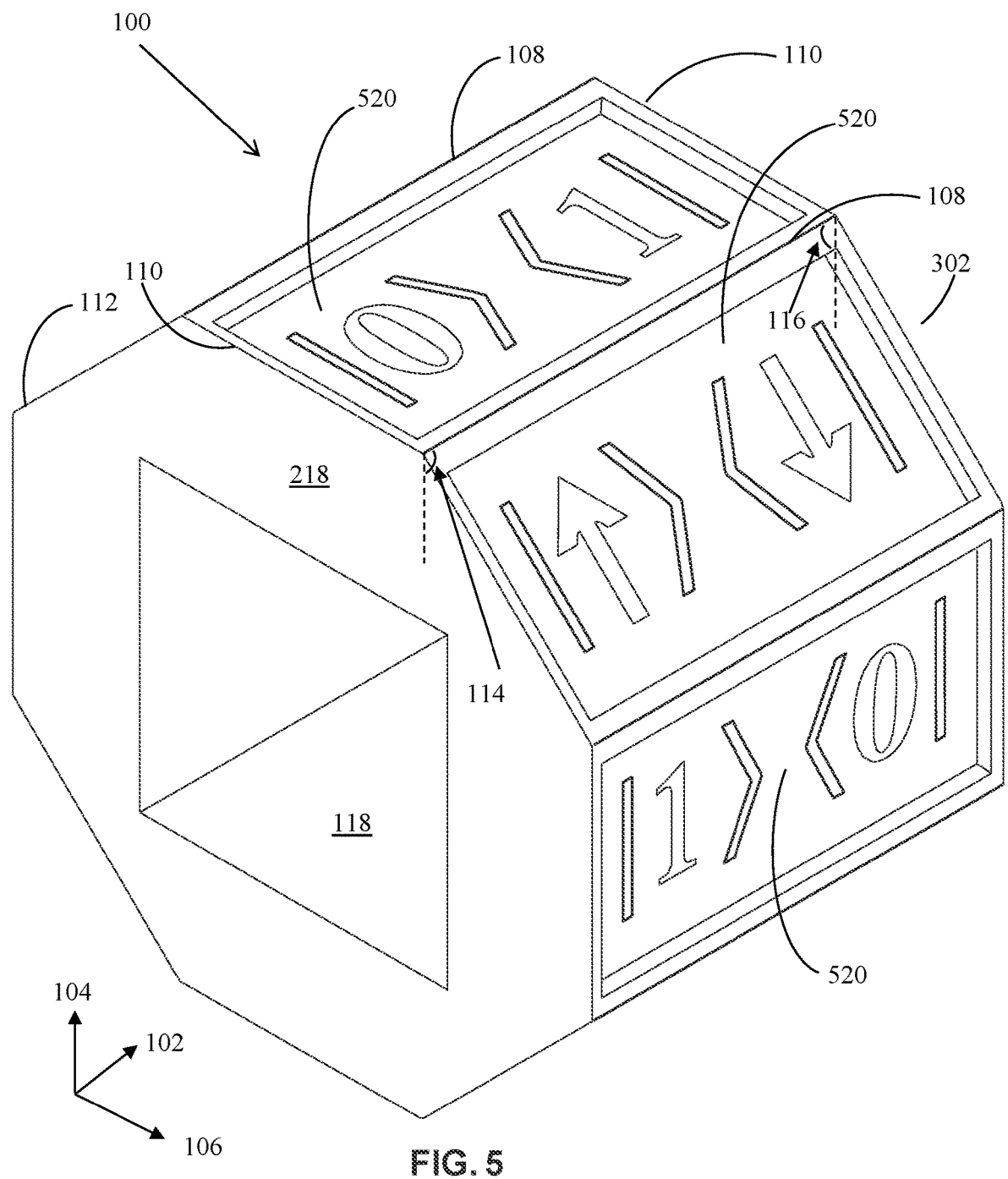
FIG. 5 illustrates an isometric view of an alternative polyhedral optical conduit, according to some embodiments.

FIG. 5 illustrates an alternative embodiment of the polyhedral optical conduit 100 where the markings 520 also include bra and ket vectors on each side 202, 204, 206, 208, 210, 212, 214, 216. However, in this embodiment, the bra and ket vectors are different on any individual side 202, 204, 206, 208, 210, 212, 214, 216. That is, for example:

|1> <0| on a pair of opposite sides 210, 212
|0> <1| on a pair of opposite sides 202, 204
|↑> <↓| on a pair of opposite sides 206, 208
|↓> <↑| on a pair of opposite sides 214, 216

In some embodiments, different bra and ket vectors indicate that the polarization of the light passing through the polyhedral optical conduit 100 will change.

During operation, the user may orient the optical device 402 in a specific way by placing the polyhedral optical conduit 100 on one of the sides 202, 204, 206, 208, 210, 212, 214, 216. The markings 120, 520 inform the user as to the orientation of the optical device 402. In addition, the markings 120, 520 inform the user as to the expected effect on light projected into the passageway 118 resulting from the orientation of the optical device 402 and according to the principles of quantum mechanics.

In some embodiments where the optical device 402 includes a polarizer, the transmission axis of the polarizer is aligned with a side of the polyhedral optical conduit 100 having the notation |1> <1|. Consequently, the absorption axis of the polarizer is aligned with a side of the polyhedral optical conduit 100 having the notation |0> <0|.

In further embodiments, the optical device 402 in the polyhedral optical conduit 100 includes a polarizer and a waveplate. Including a half-wave waveplate will cause light passing through the optical device 402 to have its polarization rotated by ninety degrees. In some embodiments, markings 520 denote the presence of the waveplate and inform the user of the corresponding effect on light passing through the polyhedral optical conduit 100.

Exemplary Operation

Figure 6:
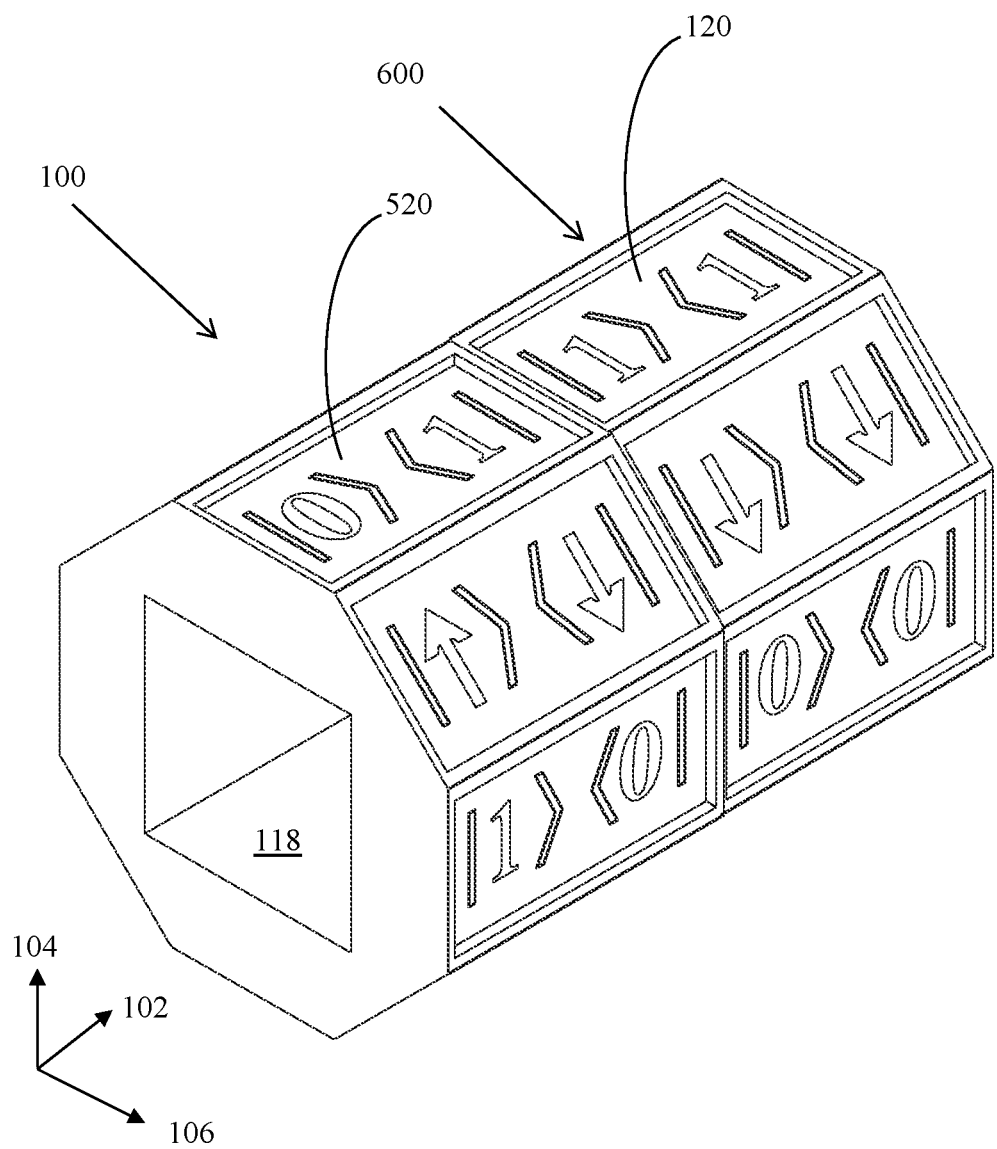
FIG. 6 illustrates an array of two polyhedral optical conduits, according to some embodiments.

FIG. 6 illustrates a typical use, in which two of the polyhedral optical conduits 100, 600, each with a passageway 118, are used together as an array. The polyhedral optical conduits 100, 600 are oriented such that the longitudinal axis 102, first transverse axis 104, and second transverse axis 106 of each are identical. The polyhedral optical conduits 100, 600 are placed adjacent to each other such that the passageways 118 are aligned.

In some embodiments, each of the polyhedral optical conduits 100, 600 includes one or more optical devices 402. In one exemplary configuration, the polyhedral optical conduit 100 includes a polarizer as the optical device 402 with its transmission axis aligned with a side of the polyhedral optical conduit 100 having the notation |1><1|. Also, in this configuration, the polyhedral optical conduit 600 includes a polarizer and a half-wave waveplate as the optical device 402, with the fast optical axis of the waveplate oriented at forty-five degrees relative to the transmission axis of the polarizer.

In FIG. 6, when the user projects light into the passageway 118 of the polyhedral optical conduit 100, that light will exit the polyhedral optical conduit 600 if the user has oriented them such that the markings 120, 520 appear as follows:

|0> <1| |1> <1|
|1> <0| |0> <0|
|↓> <↑| |↑> <↑|
|↑> <↓| |↓> <↓|

Figure 7:
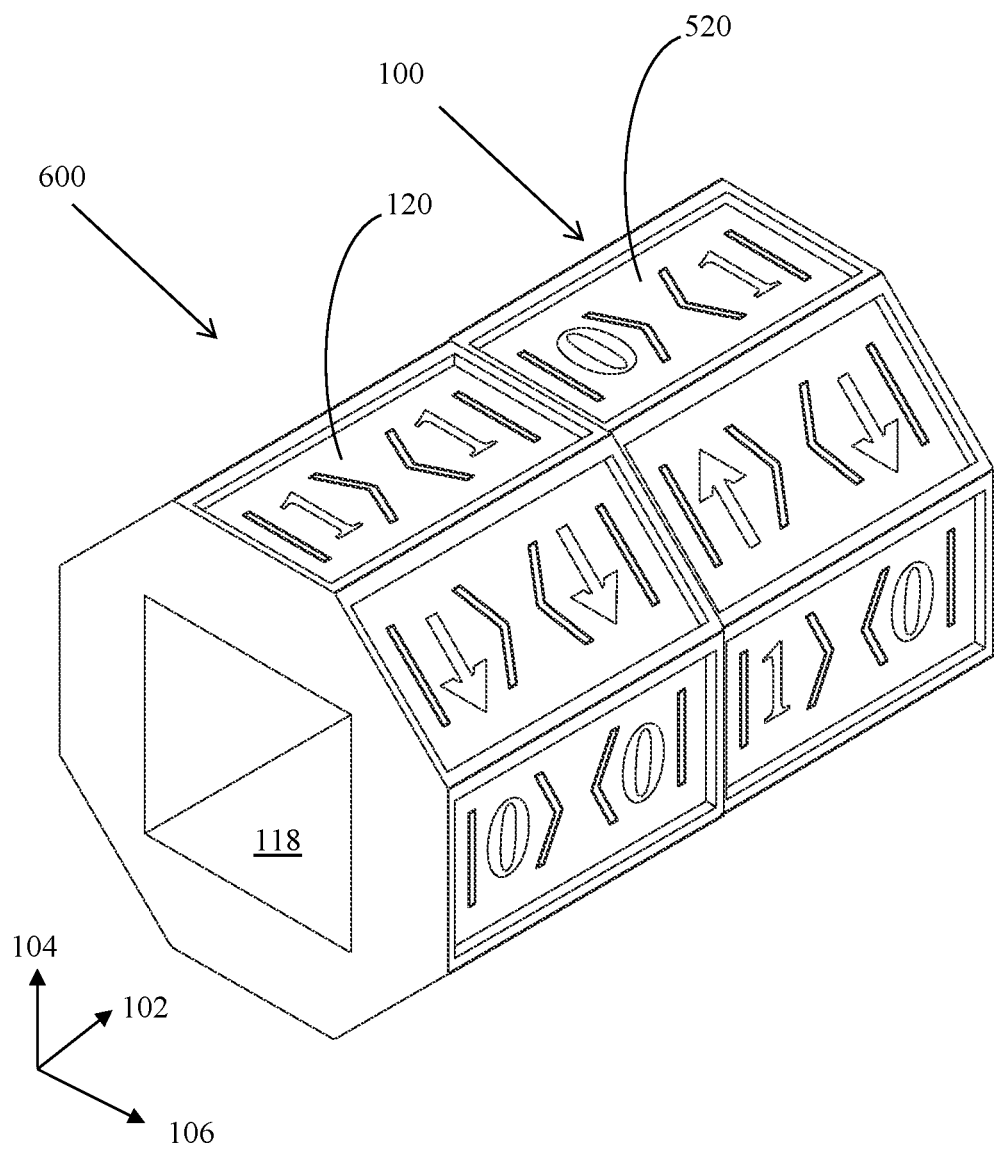
FIG. 7 illustrates an alternative array of two polyhedral optical conduits, according to some embodiments.

In contrast, when the order of the polyhedral optical conduits 100, 600 is reversed as shown in FIG. 7, and the user projects light into the passageway 118 of the polyhedral optical conduit 600, no light will exit the polyhedral optical conduit 100 if the user has oriented them such that the markings 120, 520 appear as follows:

|1> <1| |0> <1|
|0> <0| |1> <0|
|↑> <↑| |↓> <↑|
|↓> <↓| |↑> <↓>

In other words, the user can expect the incoming light to exit the array of polyhedral optical conduits 100, 600 as long as they are oriented such that the ket vector on the first conduit is the same as the bra vector on the second conduit. Deviations from this orientation, due to, e.g., rotation of a conduit and/or changing the sequence of the polyhedral optical conduits 100, 600, helps illustrate the differences between quantum mechanics and classical mechanics.

Figure 8:
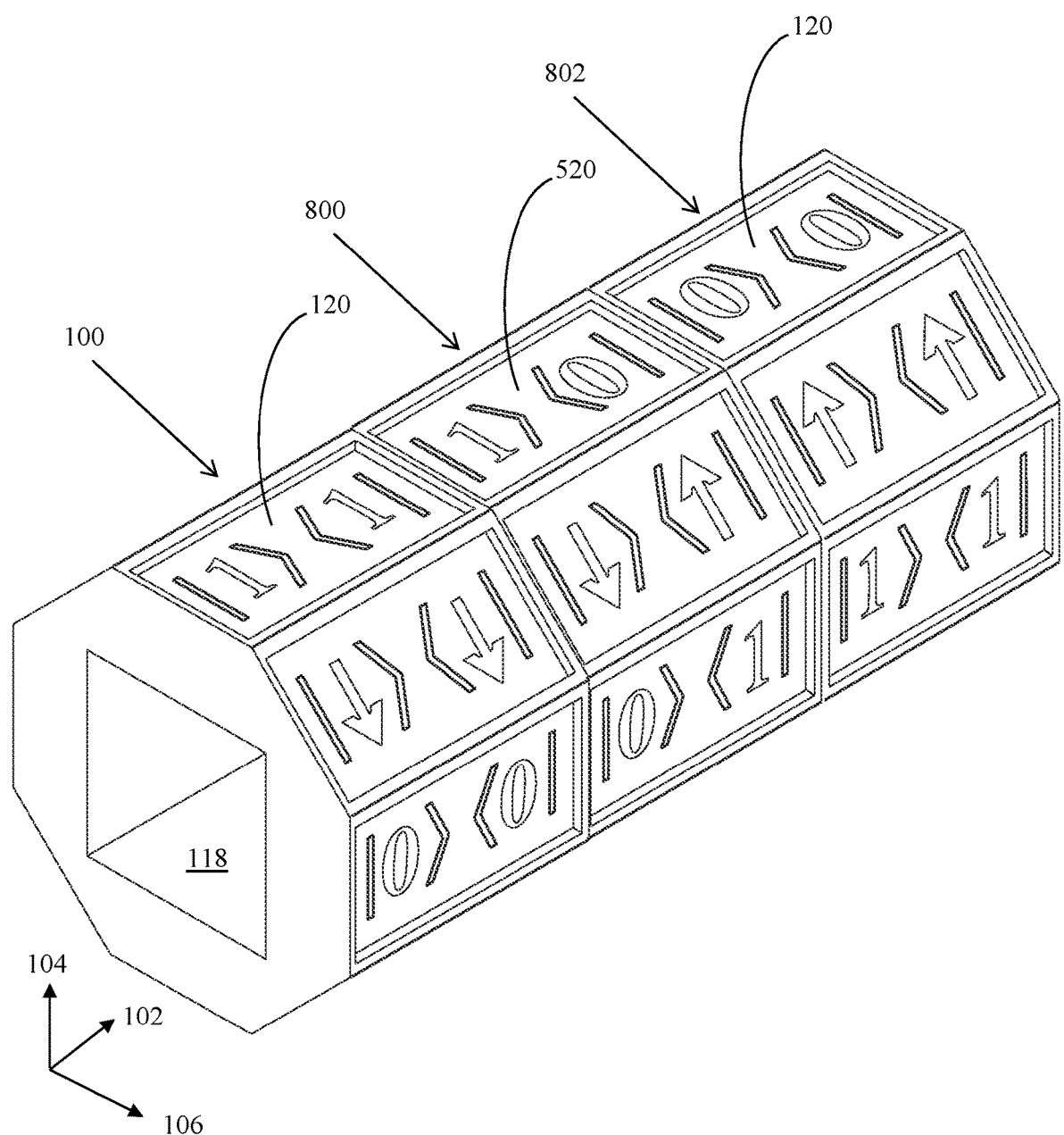
FIG. 8 illustrates an array of three polyhedral optical conduits, according to some embodiments.

FIG. 8 illustrates an array of three polyhedral optical conduits 100, 800, 802. In the depicted configuration, the ket vectors on each conduit are the same as the bra vectors on the adjacent conduit. Therefore, incoming light incident on the passageway 118 of the polyhedral optical conduit 100 will exit the array at the polyhedral optical conduit 802.

Although the discussion herein focuses on embodiments in the shape of a decahedron, the invention comprises other polyhedral optical waveguides in other shapes, e.g., a tetradecahedron, sometimes described as a dodecagonal prism. The additional sides present in other polyhedrons can provide additional resting positions. For example, the tetradecahedron can reduce the rotational increment to, e.g., 22.5 degrees. This can further change the appearance of the exiting light.

To the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112(f), unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A polyhedral optical conduit, comprising:
   a longitudinal axis, a first transverse axis perpendicular to the longitudinal axis, and a second transverse axis perpendicular to both the longitudinal axis and the first transverse axis;
   a first side parallel to a second side, each side having two longitudinal edges and two transverse edges;
   a third side parallel to a fourth side, each side having two longitudinal edges and two transverse edges;
   a fifth side parallel to a sixth side, each side having two longitudinal edges and two transverse edges;
   a seventh side parallel to an eighth side, each side having two longitudinal edges and two transverse edges;
   a ninth side parallel to a tenth side, each side having a plurality of transverse edges;
   wherein:
   the first side and the third side are joined along one of their respective longitudinal edges at a first angle;

the third side and the fifth side are joined along one of their respective longitudinal edges at a second angle;

the fifth side and the seventh side are joined along one of their respective longitudinal edges at a third angle;

the seventh side and the second side are joined along one of their respective longitudinal edges at a fourth angle;

the second side and the fourth side are joined along one of their respective longitudinal edges at a fifth angle;

the fourth side and the sixth side are joined along one of their respective longitudinal edges at a sixth angle;

the sixth side and the eighth side are joined along one of their respective longitudinal edges at a seventh angle;

the ninth side is joined to at least one of the first through eighth sides along one of the transverse edges of each of the at least one of the first through eighth sides at a ninth angle;

the tenth side is joined to at least one of the first through eighth sides along the second of the transverse edges of each of the at least one of the first through eighth sides at a tenth angle;

the ninth side defining a first opening, the first opening in a first plane defined by the first transverse axis and the second transverse axis;

the tenth side defining a second opening, the second opening in a second plane defined by the first transverse axis and the second transverse axis;

the polyhedral optical conduit defines a passageway having a length between the first opening and the second opening, the passageway oriented along the longitudinal axis and through which electromagnetic radiation travels to be manipulated; and further comprising at least one optical device having a thickness and a defined orientation disposed in the passageway and positioned in the plane defined by the first transverse axis and the second transverse axis so as to manipulate the electromagnetic radiation;

wherein the length of the passageway is greater than the thickness of the optical device.

2. The polyhedral optical conduit of claim 1, wherein the eighth side and the first side are joined along one of their respective longitudinal edges at an eighth angle.

3. The polyhedral optical conduit of claim 2, wherein each of the first through eighth angles is approximately 45 degrees.

4. The polyhedral optical conduit of claim 3, wherein each of the ninth and tenth angles is approximately 90 degrees.

5. The polyhedral optical conduit of claim 4, wherein the polyhedral optical conduit is in the form of a decahedron.

6. The polyhedral optical conduit of claim 1, wherein the at least one optical device comprises a polarizer.

7. The polyhedral optical conduit of claim 1, wherein the at least one optical device comprises a waveplate.

8. The polyhedral optical conduit of claim 7, wherein the waveplate comprises a half-wave waveplate.

9. The polyhedral optical conduit of claim 7, wherein the waveplate comprises a quarter-wave waveplate.

10. The polyhedral optical conduit of claim 1, wherein the orientation of the optical device is approximately 45 degrees relative to at least one of the axes of the polyhedral optical conduit.

11. The polyhedral optical conduit of claim 1, wherein the orientation of the optical device is approximately 0 degrees relative to at least one of the axes of the polyhedral optical conduit.

12. The polyhedral optical conduit of claim 1, wherein at least one of the sides comprises marking related to the orientation of the optical device.

13. The polyhedral optical conduit of claim 12, wherein the marking comprises Dirac bra-ket notation.

14. The polyhedral optical conduit of claim 1, wherein the optical device is fixed relative to the longitudinal axis, the first transverse axis, and the second transverse axis.

15. The polyhedral optical conduit of claim 1, wherein the optical device is movable relative to a least one of the longitudinal axis, the first transverse axis, and the second transverse axis.

16. A polyhedral optical conduit array, comprising:
a first polyhedral optical conduit;
a second polyhedral optical conduit; and
a longitudinal axis, a first transverse axis perpendicular to the longitudinal axis, and a second transverse axis perpendicular to both the longitudinal axis and the first transverse axis, all such axes common to the first polyhedral optical conduit and the second polyhedral optical conduit;
wherein the first polyhedral optical conduit defines a first passageway oriented along the longitudinal axis;
wherein the second polyhedral optical conduit defines a second passageway oriented along the longitudinal axis;
wherein the first polyhedral optical conduit and the second polyhedral optical conduit are disposed adjacent to each other along a plane defined by the first transverse axis and the second transverse axis so as to align the first passageway with the second passageway, and
wherein electromagnetic radiation enters the first passageway, travels through the first passageway into the second passageway and then exits the second passageway.

17. The polyhedral optical conduit array of claim 16, wherein the first polyhedral optical conduit is in the form of a decahedron.

18. The polyhedral optical conduit array of claim 16, wherein the second polyhedral optical conduit is in the form of a decahedron.

19. The polyhedral optical conduit array of claim 16, wherein at least one optical device is disposed in at least one of the first passageway and the second passageway.

20. The polyhedral optical conduit array of claim 19, wherein the at least one optical device comprises at least one of a polarizer and a waveplate.

* * * * *